US012768773B2

(12) United States Patent
Kim et al.

(10) Patent No.: US 12,768,773 B2
(45) Date of Patent: Oct. 20, 2026

(54) MATERIAL CLASSIFICATION APPARATUS AND METHOD BASED ON MULTI-SPECTRAL NIR BAND

(71) Applicant: KOREA UNIVERSITY RESEARCH AND BUSINESS FOUNDATION, Seoul (KR)

(72) Inventors: Jong Ok Kim, Seoul (KR); Dong Keun Han, Suwon-si (KR)

(73) Assignee: Korea University Research and Business Foundation, Seoul (KR)

( * ) Notice: Subject to any disclaimer, the term of this patent is extended or adjusted under 35 U.S.C. 154(b) by 490 days.

(21) Appl. No.: 18/332,096

(22) Filed: Jun. 9, 2023

(65) Prior Publication Data

US 2023/0400406 A1 Dec. 14, 2023

(30) Foreign Application Priority Data

Jun. 9, 2022 (KR) ........................ 10-2022-0069865

(51) Int. Cl.

*G06V 10/143* (2022.01)
*G01N 21/27* (2006.01)
*G06V 10/764* (2022.01)
*G06V 10/77* (2022.01)
*G06V 20/70* (2022.01)
*G01N 21/17* (2006.01)

(52) U.S. Cl.

CPC ........... *G01N 21/27* (2013.01); *G06V 10/143* (2022.01); *G06V 10/764* (2022.01); *G06V 10/7715* (2022.01); *G06V 20/70* (2022.01); *G01N 2021/1765* (2013.01); *G01N 2201/126* (2013.01)

(58) Field of Classification Search

CPC ........... G01N 21/27; G01N 2021/1765; G01N 2201/126; G01N 21/359; G01N 21/314; G06V 10/143; G06V 10/7715; G06V 10/764; G06V 20/70; G06V 10/58; G06V 40/40; G06V 10/82

See application file for complete search history.

(56) References Cited

PUBLICATIONS

Mou, Lichao, and Xiao Xiang Zhu. "Learning to pay attention on spectral domain: A spectral attention module-based convolutional network for hyperspectral image classification." IEEE Transactions on Geoscience and Remote Sensing 58.1 (2019): 110-122. (Year: 2019).*

(Continued)

*Primary Examiner* — Amandeep Saini
*Assistant Examiner* — Denise G Alfonso
(74) *Attorney, Agent, or Firm* — NSIP Law

(57) ABSTRACT

Disclosed are a material classification apparatus and method based on a multi-spectral NIR band. A material classification apparatus based on a multi-spectral NIR band includes: an input unit configured to acquire a multi-band NIR image of a target; an attention module configured to generate a spatio-spectral correlation map considering spatial information on the multi-band NIR image and a correlation between each band; and a classification model unit configured to analyze the spatio-spectral correlation map and output a material classification label for the target.

3 Claims, 9 Drawing Sheets

(56) References Cited

PUBLICATIONS

Li, Ningyang, and Zhaohui Wang. "Spectral-spatial fused attention network for hyperspectral image classification." 2021 IEEE International conference on image processing (ICIP). IEEE, 2021. (Year: 2021).*

Guokun Chen, Li, Zhengtao, and Tianxu Zhang. "Temporal attention networks for multitemporal multisensor crop classification." Ieee Access 7 (2019): 134677-134690. (Year: 2019).*

Guo, Hao, et al. "Deep collaborative attention network for hyperspectral image classification by combining 2-D CNN and 3-D CNN." IEEE Journal of Selected Topics in Applied Earth Observations and Remote Sensing 13 (2020): 4789-4802. (Year: 2020).*

Park, Eun Kyu, et al. "A Basic Study on Sorting of Black Plastics of Waste Electrical and Electronic Equipment (WEEE)." Resources Recycling 26.1 (2017): 69-77, (Abstract in English, 9 pages in Korean).

Lee, Ju-Han, et al. "Deep Learning Based RGB Reconstruction of Multi-Band NIR Images" 2021 Korea Institute of Electrical Engineers Summer Conference Proceedings, 2021, (Abstract in English, 3 pages in Korean).

* cited by examiner

[FIG. 1]
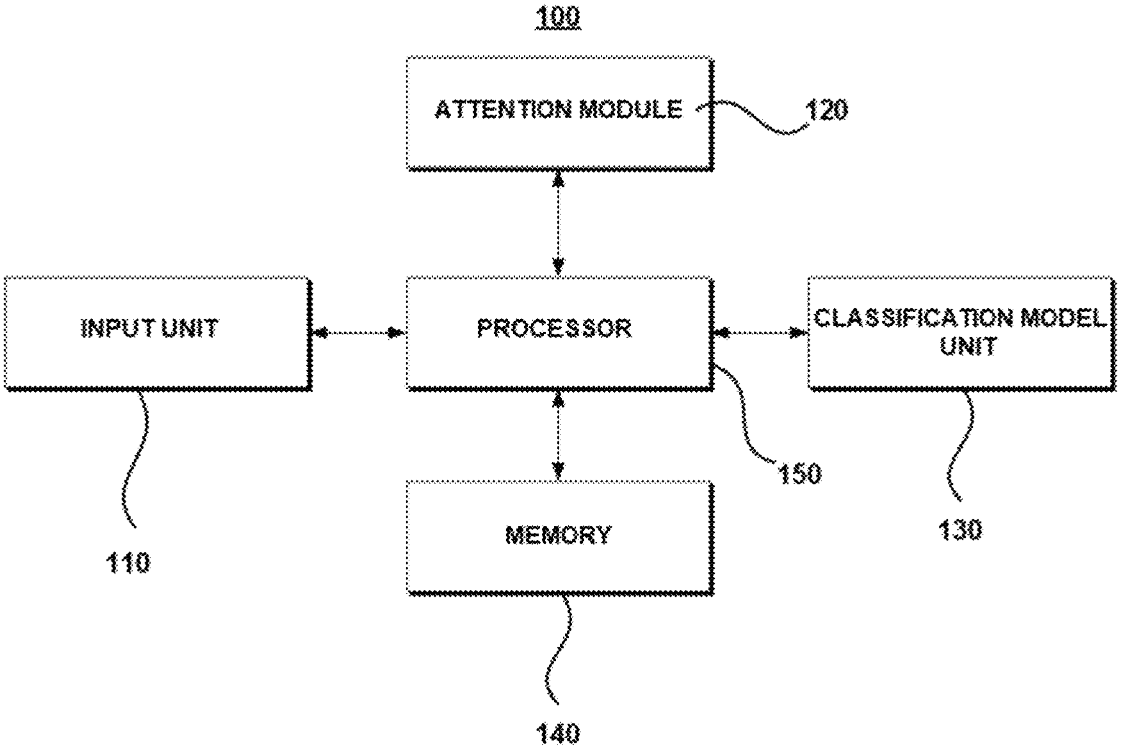

[FIG. 2]
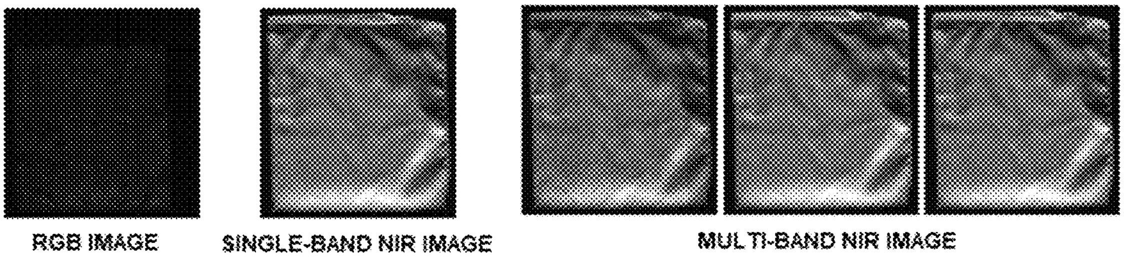

[FIG. 3]
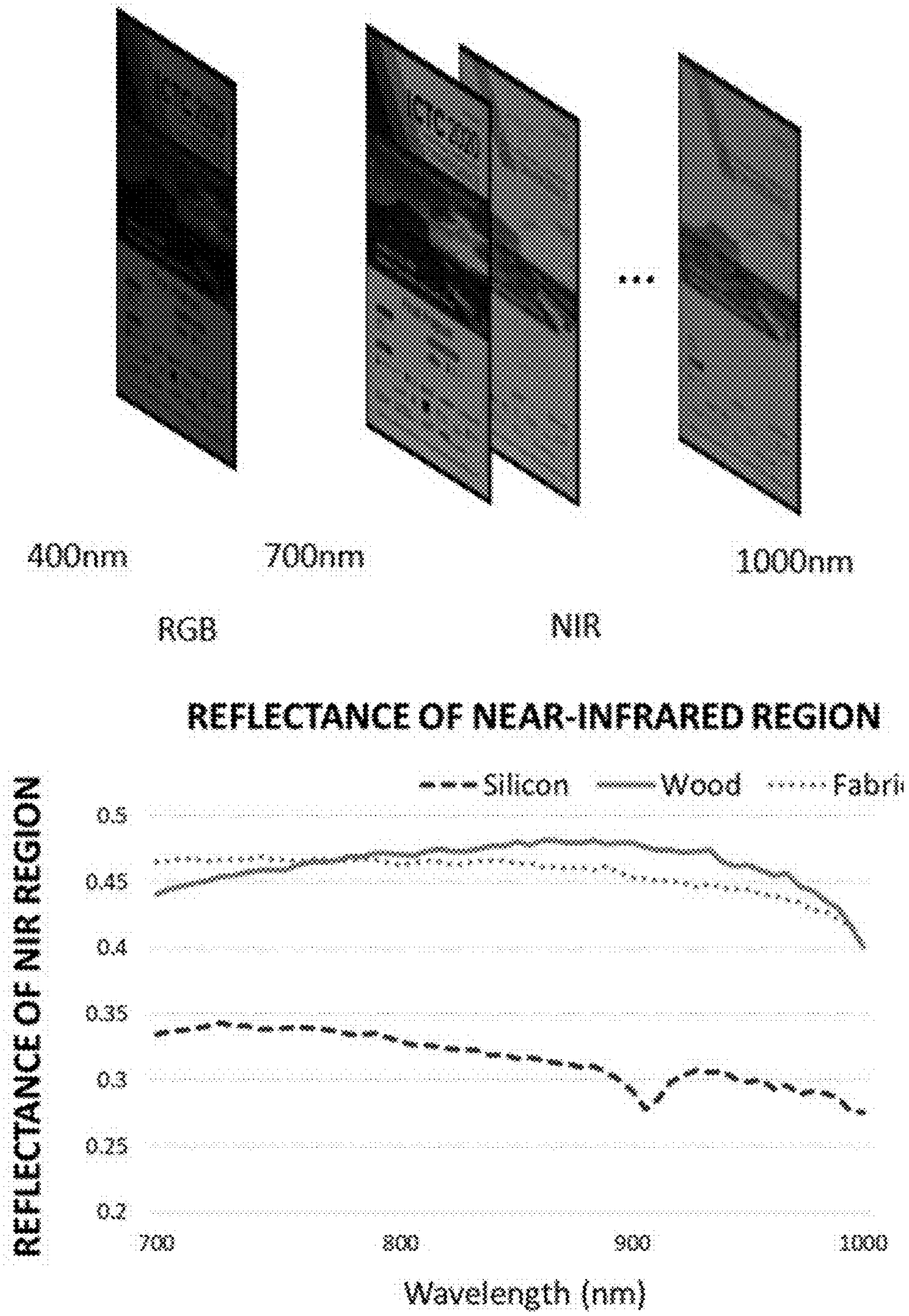

[FIG. 4]
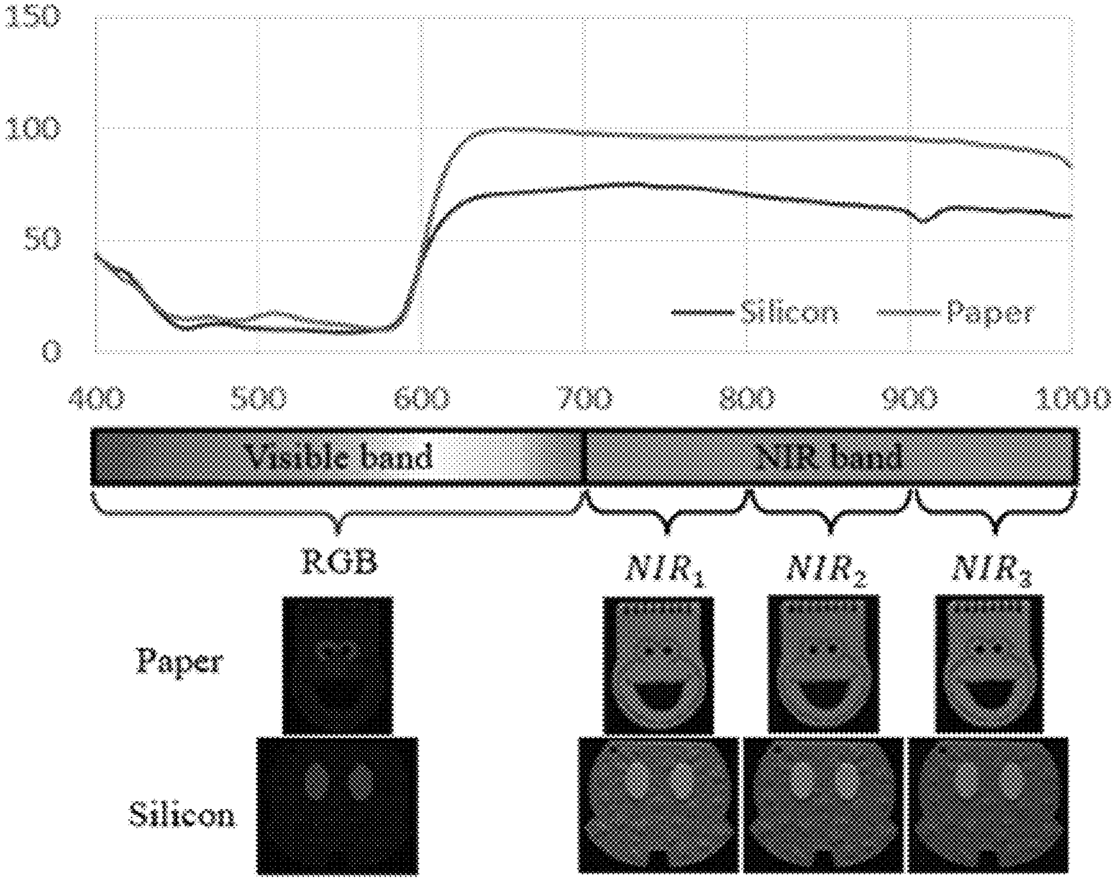

[FIG. 5]
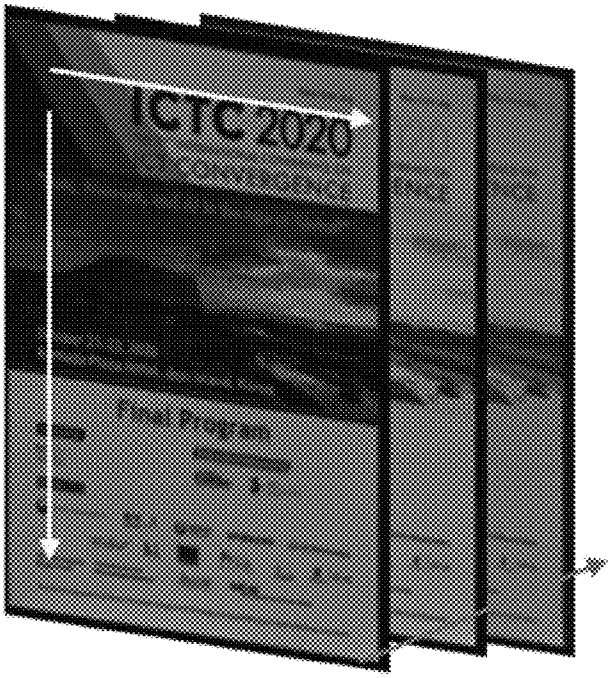

[FIG. 6]
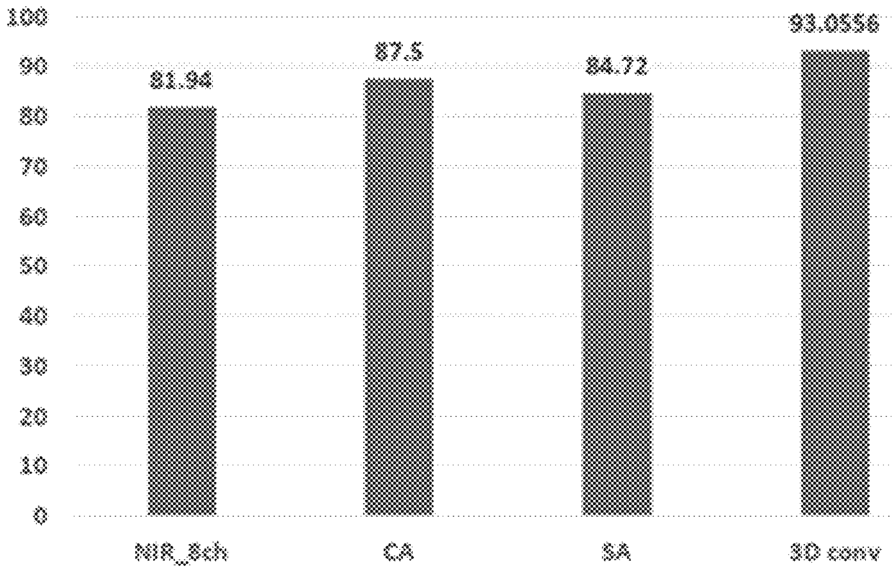

[FIG. 7]
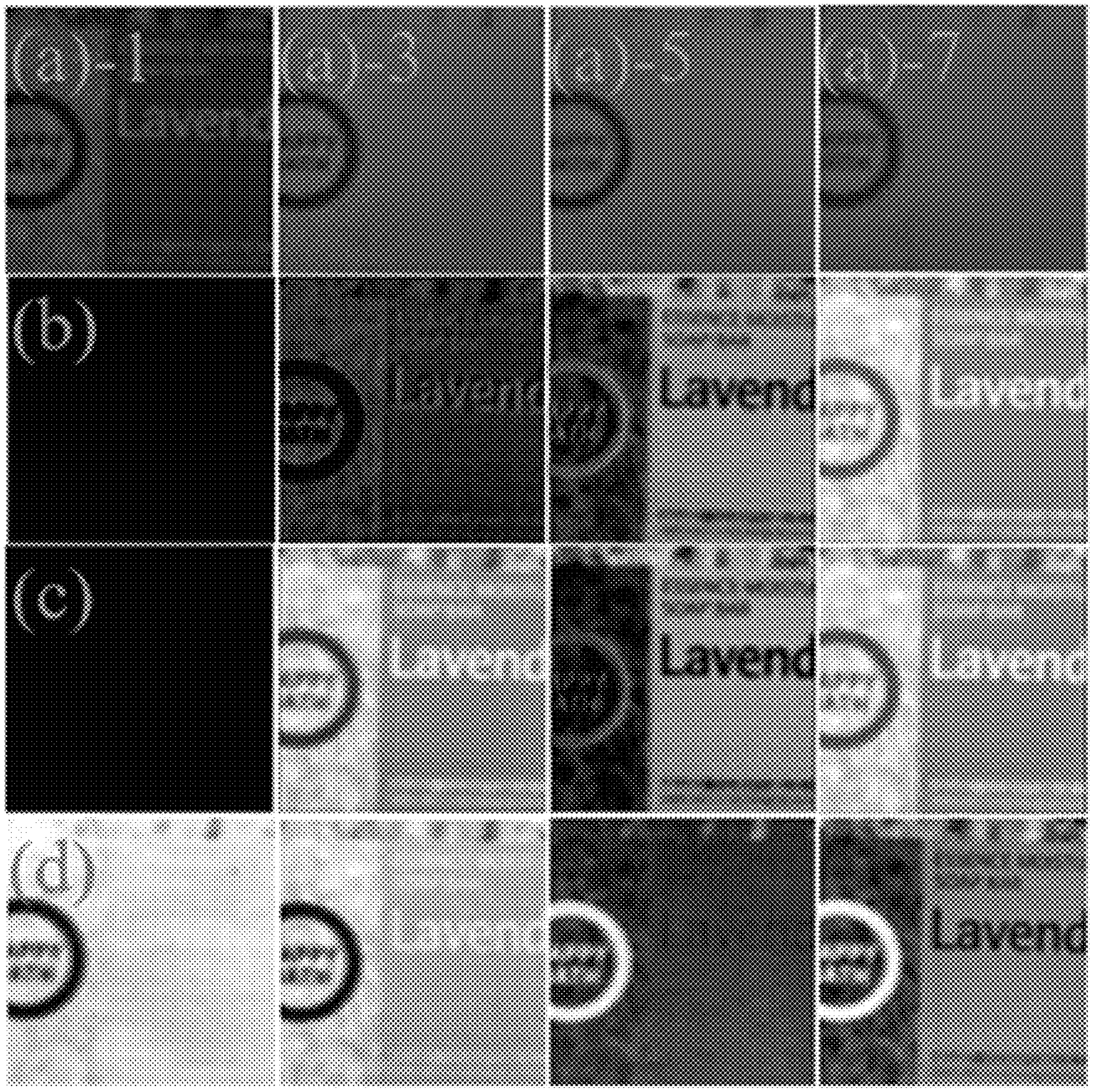

[FIG. 8]
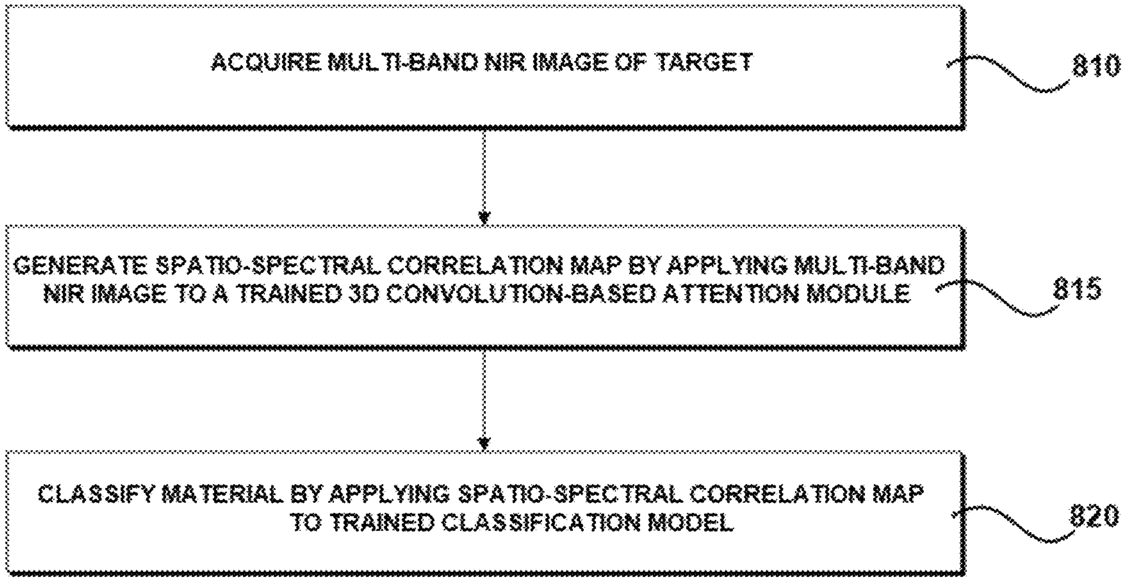

[FIG. 9]
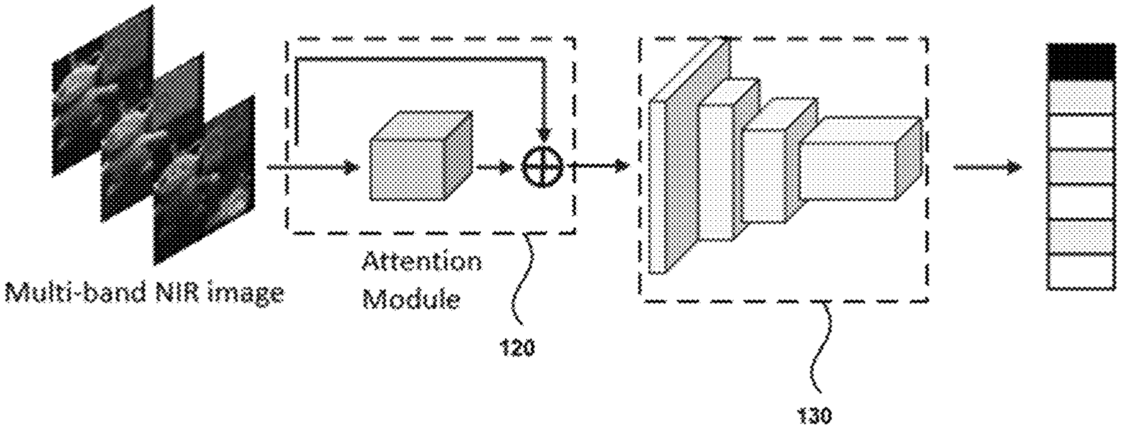

MATERIAL CLASSIFICATION APPARATUS AND METHOD BASED ON MULTI-SPECTRAL NIR BAND

CROSS-REFERENCE TO RELATED APPLICATION

This application claims under 35 U.S.C. § 119(a) the benefit of Korean Patent Application No. 10-2022-0069865 filed on Jun. 9, 2022, the disclosure of which is incorporated herein by reference in its entirety.

BACKGROUND

(a) Technical Field

The present invention relates to a material classification apparatus and method based on a multi-spectral NIR band. The present invention is supported by the National Research Foundation of Korea (NRF) grant funded by the Korea government (MSIT) (No. 2020R1A4A4079705).

(b) Background Art

In the case of an object having the same color or an object in a low-illumination environment, it is very difficult to identify the material. As illustrated in FIG. 1, since reflection is made based on color information in a visible light region, it is very difficult to distinguish a material of an object with only visible light information in the same color. In addition, in a low illumination environment, it is not easy for the human eye to sufficiently identify information on an object.

SUMMARY OF THE INVENTION

The present invention is to provide a material classification apparatus and method based on a multi-spectral NIR band.

In addition, the present invention is to provide a material classification apparatus and method based on a multi-spectral NIR band capable of classifying materials in consideration of not only spatial information but also multi-spectral information for a near-infrared image.

In addition, the present invention is applicable to the face recognition anti-spoofing field. Based on material discrimination, the present invention is possible to accurately determine whether a face is real or imitation, and the present invention can be expanded as a technology for determining whether a face is real or not of various objects. This is a key technology for vision cameras in the field of mobility, such as autonomous driving and robots.

According to an aspect of the present invention, there is provided a material classification apparatus based on a multi-spectral NIR band.

According to an embodiment of the present invention, a material classification apparatus based on a multi-spectral NIR band may include: an input unit configured to acquire a multi-band NIR image of a target; an attention module configured to generate a spatio-spectral correlation map considering spatial information on the multi-band NIR image and a correlation between each band; and a classification model unit configured to analyze the spatio-spectral correlation map and output a material classification label for the target.

The input unit may acquire the multi-band NIR image of the target by dividing a near-infrared wavelength band into n pieces (where the n is a natural number).

The attention module may be a 3D convolution-based model, and set temporal information of the 3D convolution-based model to a multi-spectral axis to generate the spatio-spectral correlation map that includes spatial information of each band image and a correlation on the multi-spectral axis.

The attention module may further receive a visible light image of the target and use the received visible light image to generate the spatial-spectral correlation map.

According to another aspect of the present invention, there is provided a material classification method based on a multi-spectral NIR band.

According to another embodiment of the present invention, a material classification method based on a multi-spectral NIR band may include: acquiring a multi-band NIR image of a target; generating a spatio-spectral correlation map considering spatial information on the multi-band NIR image and a correlation between each band by applying the multi-band NIR image to a trained 3D convolution-based attention module; and outputting a material classification label for the target by applying the spatio-spectral correlation map to the trained classification model.

According to an embodiment of the present invention, by providing a material classification apparatus and method based on a multi-spectral NIR band, it is possible to classify materials with high accuracy in consideration of not only spatial information but also multi-spectral information for near-infrared images.

BRIEF DESCRIPTION OF THE DRAWINGS

FIG. 1 is a block diagram schematically illustrating an internal configuration of a material classification apparatus based on a multi-spectral NIR band according to an embodiment of the present invention.

FIG. 2 is a diagram for comparing images in a low-illumination environment according to an embodiment of the present invention.

FIG. 3 is a diagram for describing reflectance according to materials in a near-infrared region according to an embodiment of the present invention.

FIG. 4 is a diagram comparing scale values of RGB and a near-infrared region according to materials according to an embodiment of the present invention.

FIG. 5 is a diagram for describing an operation of an attention module according to an embodiment of the present invention.

FIG. 6 is a graph comparing performance evaluation based on attention methods according to the related art and an embodiment of the present invention.

FIG. 7 is a diagram showing a result of comparing feature maps for near-infrared images for each material according to the related art and an embodiment of the present invention.

FIG. 8 is a flowchart illustrating a material classification method based on a multi-spectral NIR band according to an embodiment of the present invention.

FIG. 9 is a detailed diagram of a material classification network according to an embodiment of the present invention.

DETAILED DESCRIPTION

In the present specification, singular forms include plural forms unless the context clearly indicates otherwise. In the specification, it is to be noted that the terms “comprising” or “including,” and the like, should not be construed as necessarily including several components or several steps described in the specification and some of the above components or steps may not be included or additional components or steps should be construed as being further included. In addition, the terms " . . . unit," "module," and the like, described in the specification refer to a processing unit of at least one function or operation and may be implemented by hardware or software or a combination of hardware and software.

Hereinafter, exemplary embodiments of the present invention will be described in detail with reference to the accompanying drawings.

FIG. 1 is a block diagram schematically illustrating an internal configuration of a material classification apparatus based on a multi-spectral NIR band according to an embodiment of the present invention, FIG. 2 is a diagram for comparing images in a low-illumination environment according to an embodiment of the present invention, FIG. 3 is a diagram for describing reflectance according to materials in a near-infrared region according to an embodiment of the present invention, FIG. 4 is a diagram comparing scale values of RGB and a near-infrared region according to materials according to an embodiment of the present invention, FIG. 5 is a diagram for describing an operation of an attention module according to an embodiment of the present invention, FIG. 6 is a graph comparing performance evaluation based on attention methods according to the related art and an embodiment of the present invention, and FIG. 7 is a diagram showing a result of comparing feature maps for near-infrared images for each material according to the related art and an embodiment of the present invention.

Referring to FIG. 1, a material classification apparatus 100 based on a multi-spectral NIR band according to an embodiment of the present invention is configured to include an input unit 110, an attention module 120, a classification model unit 130, a memory 140, and a processor 150.

The input unit 110 is a means for acquiring a multi-band NIR image of a target.

Referring to FIG. 2, a wavelength band of an RGB image is 400 nm to 700 nm, and a wavelength band of a near infrared ray is 700 nm to 1000 nm. As illustrated in FIG. 2, a near-infrared image according to an embodiment of the present invention uses a multi-band image acquired by dividing a region of 700 nm to 1000 nm into several pieces.

FIG. 2 is a diagram illustrating an RGG image, a single-band NIR image, and a multi-band NIR image of a target, respectively. As illustrated in FIG. 2, it can be seen that the single-band NIR image is easier to identify than an RGB image in a low-illumination environment, and the multi-band NIR image shows more detailed information on an object than a single-band NIR image.

FIG. 3 is a graph showing reflectance in a near-infrared region according to materials, and it can be seen that, when comparing spectral curves for reflectance for each material, a large difference is shown in terms of reflectance intensity. In addition, as illustrated in FIG. 2, it can be seen that in case of some materials, a non-linear appearance is observed in the vicinity of a specific wavelength band.

FIG. 4 is a diagram comparing scale values of RGB and near-infrared regions according to materials. As illustrated in FIG. 4, it can be seen that the near-infrared image has scale characteristics different from those of the RGB image.

That is, as illustrated in FIGS. 3 and 4, it can be seen that the near-infrared image contains important features not only in scale characteristics but also in a correlation between bands according to the materials.

The attention module 120 is a means for generating a spatio-spectral correlation map considering spatial information of the multi-band NIR image and the correlation between each band.

This will be described in more detail with reference to FIG. 5.

According to an embodiment of the present invention, the attention module 120 may be a 3D convolution-based module. Accordingly, the attention module 120 may replace temporal information of a 3D convolution model with spectral information.

In this way, the attention module 120 may generate the spatio-spectral correlation map that simultaneously considers the spatial information of the multi-band NIR image and the correlation between each band through the 3D convolution model.

Since the 3D convolution model itself is a well-known technology, a separate description of the function and operation of the 3D convolution model will be omitted.

However, according to an embodiment of the present invention, the 3D convolution-based attention module 120 does not utilize temporal information, unlike the conventional 3D convolution model, and may replace the temporal information with spectral information. In this way, the conventional 3D convolution model may use a spatio-temporal feature of an image, whereas the attention module 120 according to an embodiment of the present invention may use a spatial-spectral correlation feature of the multi-band NIR image.

As already described above with reference to FIGS. 2 and 3, it can be seen that the multi-band NIR image has a nonlinear singularity in the vicinity of a specific wavelength band according to the materials.

Therefore, in an embodiment of the present invention, the near-infrared image acquired by dividing the multi-band NIR image into n wavelength bands may be applied to the 3D convolution-based attention module 120 to derive the spatio-spectral correlation map that considers a correlation between each multi-spectral axis by using spatial features of each near-infrared image and a multi-band axis as the temporal information.

In this way, the spatio-spectral correlation map may be derived by simultaneously considering the spatial information of the near-infrared image and the multi-spectral aspect information (i.e., correlation between bands) through the 3D convolution-based attention module 120, and used for material classification, thereby improving classification accuracy.

FIG. 6 is a graph comparing performance evaluation according to the attention method.

FIG. 6 illustrates a comparison whether the correlation between bands in the near-infrared image helps improve material classification performance. FIG. 5 illustrates a result of comparing performance of a spatial attention method of applying attention to spatial information and a channel attention method of applying attention to channels of features with performance of a method (3D conv) of applying attention to spatial-spectral correlation of the present invention, when only the multi-band NIR image is used without considering the correlation between bands. As illustrated in FIG. 5, it can be seen that the 3D convolution-based attention model that simultaneously utilizes spatial and spectral attentions shows higher classification performance.

FIG. 7 is a diagram illustrating a result of comparing feature maps for near-infrared images for each material according to the related art and an embodiment of the present invention.

FIG. 7A is a diagram illustrating images of first, third, fifth, and seventh channels, respectively, of the multi-band NIR image, FIG. 7B is a diagram illustrating a result of applying channel attention, FIG. 7C is a diagram illustrating a result of applying spatial attention, and FIG. 7D is a diagram illustrating a result of applying the spatial-spectral attention according to an embodiment of the present invention.

It can be seen that, when the channel attention and the spatial attention are applied respectively, features are not well extracted in a front band region of the near-infrared image, and the shape takes on a dark form on the whole. On the other hand, it can be seen that features that may not be extracted from the original image are extracted as it goes to the back bands, and detail restoration is improved.

In this way, it can be seen that the correlation between multiple bands in the near-infrared image exists in a specific band, which is different for each material.

Therefore, when all the spatial-spectral attentions are considered as in an embodiment of the present invention, it can be seen that the feature map for the shape of the object is well extracted from the front band, and the intensity value is increased overall. In addition, it can be seen that the back bands show a significant feature that is opposite in scale compared to the front bands.

Therefore, it can be seen that the performance of the material classification is improved by additionally considering multi-spectral information as well as spatial information when classifying materials of a surface of an object using a near-infrared image.

In this way, as in an embodiment of the present invention, it can be seen that, by extracting the spatio-spectral correlation map for the multi-band NIR image through the 3D convolution-based attention module 120 and using the extracted spatio-spectral correlation map for the material classification, the material classification accuracy is higher than separately using the spatial or spectral information.

The classification model unit 130 is a means for classifying materials using the spatio-spectral correlation map generated by the attention module 120. It is assumed that the classification model unit 130 is pre-trained for the spatio-spectral correlation map and each material label. The classification model unit 130 may classify a material of an object using EfficientNet, which is a classification network.

The classification model unit 130 may be trained using a cross-entropy loss function. The cross-entropy loss may be calculated using Equation 1 below.

$$H(p, q) = -\sum_{x} p(x)\log q(x) \qquad \text{[Equation 1]}$$

Here, p denotes actual data (correct answer label), and q denotes the material classification result (label) generated through the trained classification model. In addition, x denotes a classification label index.

In addition, for quantitative evaluation for classifying the material of the object, the accuracy evaluation performance was calculated as shown in Equation 2.

$$\text{Accuracy} = \frac{TP + TN}{TP + FN + FP + TN} \qquad \text{[Equation 2]}$$

Here, TP denotes true positive, TN denotes true negative, FN denotes false negative, and FP denotes false positive.

In addition, according to an embodiment of the present invention, instead of using only the multi-band NIR image, the spatio-spectral correlation map may be generated using the RGG image (visible light image) together with the multi-band NIR image and used for the material classification. A network structure for material classification of an object including the attention module 120 and the classification model unit 130 is illustrated in detail in FIG. 9.

The memory 140 is a means for storing instructions for performing a material classification method using a multi-band NIR image according to an embodiment of the present invention.

The processor 150 is a means for controlling internal components (e.g., the input unit 110, the attention module 120, the classification model unit 130, the memory 140, etc.) of the material classification apparatus 100 based on a multi-spectral NIR band according to an embodiment of the present invention.

FIG. 8 is a flowchart illustrating a material classification method based on a multi-spectral NIR band according to an embodiment of the present invention.

In step 810, the material classification apparatus 100 acquires a multi-band NIR image of a target. Of course, the material classification apparatus 100 may acquire an RGB image of a target together with a multi-band NIR image.

In step 815, the material classification apparatus 100 applies the multi-band NIR image to the trained 3D convolution-based attention module to generate the spatio-spectral correlation map. As already described above, the 3D convolution-based attention module is a 3D convolution model, but uses the temporal information as the spectral information.

Therefore, the 3D convolution-based attention module may simultaneously consider the spatial attention and the spectral attention after receiving the multi-band NIR image to generate the spatio-spectral correlation map.

In addition, the material classification apparatus 100 may apply both the multi-band NIR image and the RGB image to the 3D convolution-based attention module to generate the spatio-spectral correlation map.

In step 820, the material classification apparatus 100 applies the spatio-spectral correlation map to the trained classification model to classify the material. It is assumed that the 3D convolution-based attention module and the classification model are pre-trained based on training data.

The apparatus and the method according to the embodiment of the present invention may be implemented in the form of program commands that may be executed through various computer means and may be recorded in a computer-readable medium. The computer-readable medium may include a program command, a data file, a data structure, or the like, alone or a combination thereof. The program commands recorded in the computer-readable medium may be especially designed and constituted for the present invention or known to those skilled in a field of computer software. Examples of the computer-readable medium may include magnetic media such as a hard disk, a floppy disk, and a magnetic tape, optical media such as a compact disk read only memory (CD-ROM) or a digital versatile disk (DVD), magneto-optical media such as a floptical disk, and a hardware device specially configured to store and execute program commands, such as a ROM, a random access memory (RAM), a flash memory, or the like. Examples of the program commands include a high-level language code capable of being executed by a computer using an interpreter, or the like, as well as a machine language code made by a compiler.

The above-mentioned hardware device may be constituted to be operated as one or more software modules in order to perform an operation according to the present invention, and vice versa.

Hereinabove, the present invention has been described with reference to exemplary embodiments thereof. It will be understood by those skilled in the art to which the present invention pertains that the present invention may be implemented in a modified form without departing from essential characteristics of the present invention. Therefore, the exemplary embodiments disclosed herein should be considered in an illustrative aspect rather than a restrictive aspect. The scope of the present invention is shown in the claims rather than the above-mentioned description, and all differences within the scope equivalent to the claims will be interpreted to fall within the present invention.

What is claimed is:

1. A material classification apparatus based on a multi-spectral NIR band, comprising:

an input unit configured to acquire a multi-band NIR image of a target, the multi-band NIR image comprising a plurality of near-infrared band images respectively sensed from reflected near-infrared light in a plurality of wavelength sub-bands obtained by dividing a near-infrared wavelength region of 700 nm to 1000 nm into n wavelength sub-bands, where n is equal to or greater than 2;

an attention module configured to generate a spatio-spectral correlation map that encodes, for the plurality of near-infrared band images, material-dependent correlations among the plurality of wavelength sub-bands in association with spatial coordinates of the target, the material-dependent correlations corresponding to spectral variations of the reflected near-infrared light according to a material of the target; and a classification network model configured to analyze the spatio-spectral correlation map and output a material classification label indicating a surface material of the target, wherein the attention module comprises a 3D convolution-based model whose temporal dimension is set as a multi-spectral axis, corresponding to the plurality of wavelength sub-bands, wherein the 3D convolution-based model generates the spatio-spectral correlation map by applying a 3D convolution operation to the plurality of near-infrared band images along the multi-spectral axis and spatial axes, without using temporal sequence inputs and without using temporal attention units, and wherein the classification network model is trained to classify the surface material of the target based on the spatio-spectral correlation map.

2. The material classification apparatus of claim 1, wherein the attention module further receives a visible light image of the target, the visible light image having a wavelength band of 400 nm to 700 nm and being different from the multi-band NIR image, and wherein the attention module generates the spatio-spectral correlation map by using the visible light image together with the plurality of near-infrared band images.

3. A material classification method based on a multi-spectral NIR band, comprising:

acquiring a multi-band NIR image of a target, the multi-band NIR image comprising a plurality of near-infrared band images respectively sensed from reflected near-infrared light in a plurality of wavelength sub-bands obtained by dividing a near-infrared wavelength region of 700 nm to 1000 nm into n wavelength sub-bands, where n is equal to or greater than 2;

generating, by applying the multi-band NIR image to a trained 3D convolution-based attention module, a spatio-spectral correlation map that encodes, for the plurality of near-infrared band images, material-dependent correlations among the plurality of wavelength sub-bands in association with spatial coordinates of the target, the material-dependent correlations corresponding to spectral variations of the reflected near-infrared light according to a material of the target; and outputting a material classification label indicating a surface material of the target by applying the spatio-spectral correlation map to a trained classification network model, wherein the trained 3D convolution-based attention module has a temporal dimension set as a multi-spectral axis corresponding to the plurality of wavelength sub-bands, and wherein the trained 3D convolution-based attention module generates the spatio-spectral correlation map by applying a 3D convolution operation to the plurality of near-infrared band images along the multi-spectral axis and spatial axes, without using temporal sequence inputs and without using temporal attention units, and wherein the trained classification network model is trained to classify the surface material of the target based on the spatio-spectral correlation map.

* * * * *